Nov. 18, 1924.　　　　　　　　　　　　　　　　　　1,516,446
J. C. M. MACLAGAN
DOUBLE ACTING TWO-STROKE CYCLE INTERNAL COMBUSTION ENGINE
Filed March 28, 1923
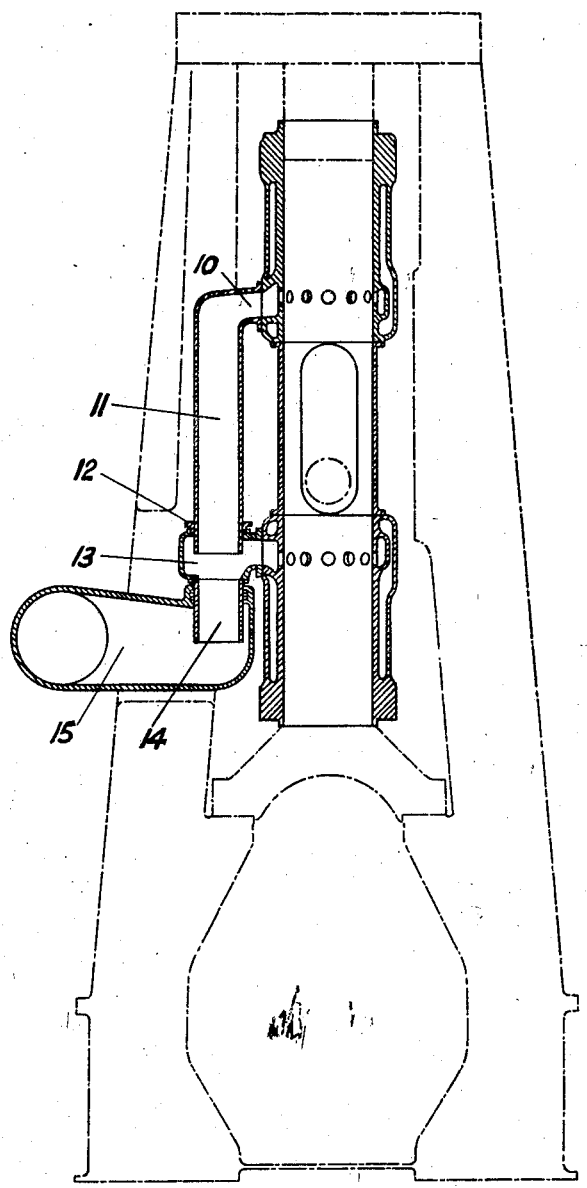
INVENTOR
JOHN C. M. MACLAGAN
BY
ATTORNEYS Patented Nov. 18, 1924.

1,516,446

UNITED STATES PATENT OFFICE.

JOHN CAMPBELL MACCALL MACLAGAN, OF DRUMCHAPEL, SCOTLAND, ASSIGNOR TO NORTH BRITISH DIESEL ENGINE WORKS, (1922) LIMITED, OF GLASGOW, SCOTLAND.

DOUBLE-ACTING TWO-STROKE CYCLE INTERNAL-COMBUSTION ENGINE.

Application filed March 28, 1923. Serial No. 628,230.

*To all whom it may concern:*

Be it known that I, JOHN CAMPBELL MAC-CALL MACLAGAN, a subject of the King of Great Britain and Ireland, and a resident of Drumchapel, Scotland, have invented certain new and useful Improvements in Double-Acting Two-Stroke Cycle Internal-Combustion Engines, of which the following is the specification.

This invention relates to double-acting two-stroke cycle internal combustion engines of the type described in the applicant's Patent No. 1,436,596 of November 21, 1922, in which a cylinder moves on two fixed heads; and has for its object to improve the connections leading from the ports—the exhaust ports towards the centre of the moving cylinder and the scavenging ports towards the ends thereof—so as to reduce to a minimum the number of parts and to simplify the construction.

According to the invention and considering the engine as vertical, the exhaust ports above the centre of the moving cylinder deliver to a manifold embracing the cylinder and terminating in a downwardly extending pipe parallel with the cylinder axis. This pipe is connected preferably by way of an expansion joint with an enlargement of the manifold for the ports below the centre of the cylinder. This lower manifold has a like pipe parallel with the cylinder axis. This pipe telescopes within a fixed manifold, some form of packing such as a gland being provided to make tight joint while permitting the pipe to slide within the manifold.

It will be seen that only one sliding connection with the fixed manifold is thus required for each engine unit.

The scavenge ports at opposite outer ends of the cylinder are (or may be) treated similarly—their connections being arranged on the opposite side of the engine.

A diagrammatic illustration of an example of the application of the invention to the exhaust ports is shown in sectional elevation on an accompanying drawing.

In this example the upper exhaust port manifold 10 has connected to it a vertical dependent pipe 11 which makes connection, through a gland packing 12 provided to permit of expansion, with an enlargement of the lower exhaust port manifold 13. This manifold 13 in turn has connected to it a vertical dependant pipe 14 making a sliding joint which is provided with packing of piston-ring type with the fixed exhaust manifold 15.

What I claim is:

1. In a double-acting two stroke internal combustion engine, a movable cylinder having upper and lower exhaust ports, a dependant exhaust pipe leading from the upper exhaust port, an exhaust manifold leading from the lower exhaust port and with which the upper exhaust pipe communicates, a stationary exhaust manifold, and a dependant exhaust pipe leading from the lower exhaust manifold into the stationary exhaust manifold and making a sliding joint therewith.

2. In a double-acting two stroke internal combustion engine, a movable cylinder having upper and lower exhaust ports, a dependant exhaust pipe leading from the upper exhaust port, an exhaust manifold leading from the lower exhaust port and into which the said dependant exhaust pipe extends in sliding relation to permit expansion of the said pipe, a stationary exhaust manifold, and a dependant exhaust pipe leading from the lower exhaust manifold into the stationary exhaust manifold and making a sliding joint therewith.

In testimony whereof I have signed my name to this specification.

JOHN CAMPBELL MACCALL MACLAGAN.